M. I. STRAUSS.
PACKING.
APPLICATION FILED MAY 18, 1917.
1,329,558.
Patented Feb. 3, 1920.
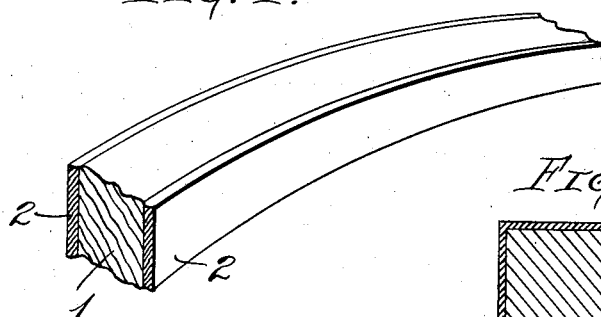
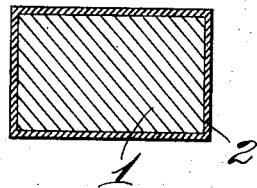
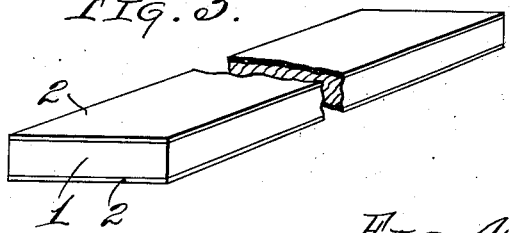
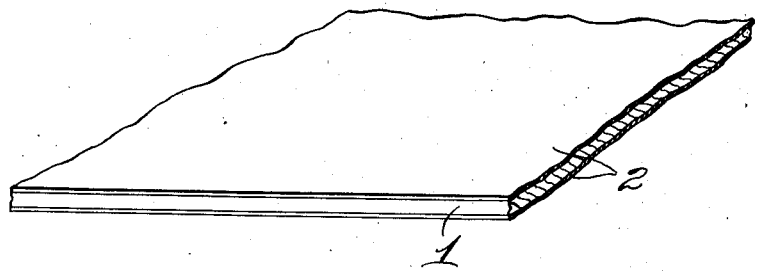
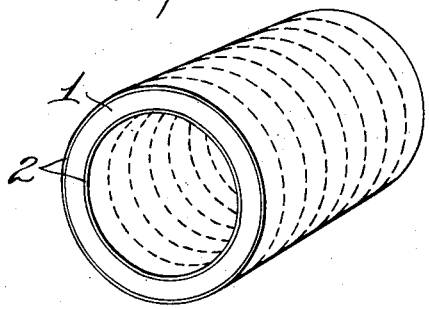
Inventor.
Mortimer I. Strauss
By Brockett and Hyde
Attys.

UNITED STATES PATENT OFFICE.

MORTIMER I. STRAUSS, OF CLEVELAND, OHIO.

PACKING.

1,329,558.     Specification of Letters Patent.     Patented Feb. 3, 1920.

Application filed May 18, 1917. Serial No. 169,452.

*To all whom it may concern:*

Be it known that I, MORTIMER I. STRAUSS, citizen of the United States, residing at Cleveland, in the county of Cuyahoga and State of Ohio, have invented certain new and useful Improvements in Packings, of which the following is a specification.

This invention relates to packings for joints, such as the joints of containers or conduits for liquids, and especially for containing or conducting gasolene, kerosene, oils or the like.

The object of the invention is to provide a packing for this purpose which has the usual required resiliency, elasticity and flexibility, but is also impervious to and unaffected by gasolene, kerosene, oils and the like, and does not deteriorate or become hard and brittle, as is the case with most packings of this kind. Further objects of the invention are in part obvious and in part will appear more in detail hereinafter.

The invention comprises the packing hereinafter described and claimed.

In the drawings Figure 1 represents a perspective view of a portion of one form of packing embodying the invention; Fig. 2 is a cross section of another form of packing; Fig. 3 is a perspective view of still another form; Fig. 4 is a perspective view of a sheet of packing material embodying the invention; and Fig. 5 is a perspective view of still another form of the invention.

Briefly described, the invention comprises a packing consisting of a base or body of suitable packing material, for example rubber, a rubber composition, or any other similar material having the usual qualities of resiliency compressibility, elasticity and flexibility requisite for the purpose. These materials are usually affected by gasolene, kerosene, oils and the like so that they are softened or otherwise affected and lose their packing or sealing ability in use. Nevertheless they are necessary for the production of leak proof joints in containers or conduits for these liquids. On this body or base is superposed a protecting coating of a material which is impervious to and unaffected by gasolene, kerosene, oils and the like which tenaciously clings to and will uniformly and completely coat rubber, composition and like gasket material, which does not become hard, brittle, tacky or sticky, and which itself is flexible and will permit the base or body to be flexed, bent or compressed without affecting the continuity of the coating. Any coating material having the qualities and characteristics just mentioned will serve the purpose, although I prefer to use the particular material described in my copending application, Serial No. 169,451, filed of even date herewith for composition of matter, to which reference may be had for a more complete description of said material and the process of making it.

As described in said application the coating material is made by dissolving or treating shellac or a shellac-like gum or substance in an alkaline solution, such as caustic soda, preferably in the presence of heat. The impurities rise to the surface and are skimmed off as a waxy substance, which is discarded. The resulting solution is then treated with an acid, such as dilute sulfuric acid, which is added in amounts slightly more than enough to neutralize the alkali. The precipitate is washed with water and dried, after which it is dissolved in a solvent, such as alcohol, to thin it and enable it to be applied as a thin coat with a brush, if desired. A body material may also be added to the thinned material, one unaffected by gasolene, kerosene, oils and the like being preferred. One substance suitable for the purpose is Venetian red, which also colors the mass and improves its consistency and spreading qualities.

The quantities of the various ingredients may vary according to circumstances, depending upon the kind of shellac or gum used, the heat required for producing solution, the strength of ingredients and solution, etc. One specimen batch was made as follows:—

The caustic soda solution consisted of ten (10) pounds of dry caustic soda dissolved in from ten (10) to fifteen (15) gallons of water, in which solution was dissolved thirty-six (36) pounds of orange shellac. Solution was promoted by heat and after complete solution the mass was allowed to cool for one-half hour and the waxy substance removed from the top of the solution.

The sulfuric acid solution was produced by slowly adding to about ten (10) gallons of water thirteen (13) pounds of oil of vitriol, 66° Baumé. This sulfuric acid solution was added to the resultant solution from the first caustic soda treatment. The mixture was allowed to stand thirty minutes to produce complete precipitation, whereupon the water was drawn off and the precipitate treated by heating gently for about one hour. The solid matter was then thinned with two gallons of 95% denatured alcohol.

It is found in practice that the quantity of dissolved and thinned shellac produced from several different batches of material, all of the same quantities, varies within limits. The quantity of body material or coloring matter to be added therefore depends on the amount of final dissolved product. Usually about two pounds of Venetian red are added to each gallon of resultant dissolved thinned shellac, although this depends considerably upon the treatment, as the heat volatilizes or expels a certain amount of shellac and considerable experience is necessary to prevent unnecessary loss.

The packing made according to my invention may take various forms. Fig. 1 of the drawings illustrates a portion of an ordinary ring like washer whose body 1 is rectangular in cross section and is formed of rubber, rubber composition or other suitable packing material. Superposed upon the inner and outer peripheral faces of said body are two continuous unbroken layers or coatings 2 of the protecting material described. Fig. 2 illustrates a cross sectional view of a similar gasket or washer coated completely on all surfaces. Fig. 3 illustrates a portion of a straight packing strip such as might be used for the joints of a large tank or receptacle for gasolene or the like. Fig. 4 illustrates a sheet of packing material having a body 1 and protecting coatings 2 upon its two opposed surfaces. Fig. 5 illustrates a hollow tube coated upon its inner and outer surfaces and which might be cut off in sections, as indicated by the dotted lines, to form distinct washers. Various other forms might be described but the common feature of all is the provision of a packing or gasket whose surfaces, especially those exposed in any way to the liquids referred to, are covered with a protecting coating which does not interfere with its ordinary functions, and permits the packing to be bent or compressed without exposing the underlying base or body.

What I claim is:—

A packing having a base or body of rubber like material and a flexible protecting coating therefor formed of material impervious to and unaffected by gasolene, oils, etc.

In testimony whereof I affix my signature.

MORTIMER I. STRAUSS.